Nov. 14, 1933.   J. F. LEVENTHAL   1,935,572
FILM FEEDING DEVICE
Filed Sept. 14, 1928    2 Sheets-Sheet 1
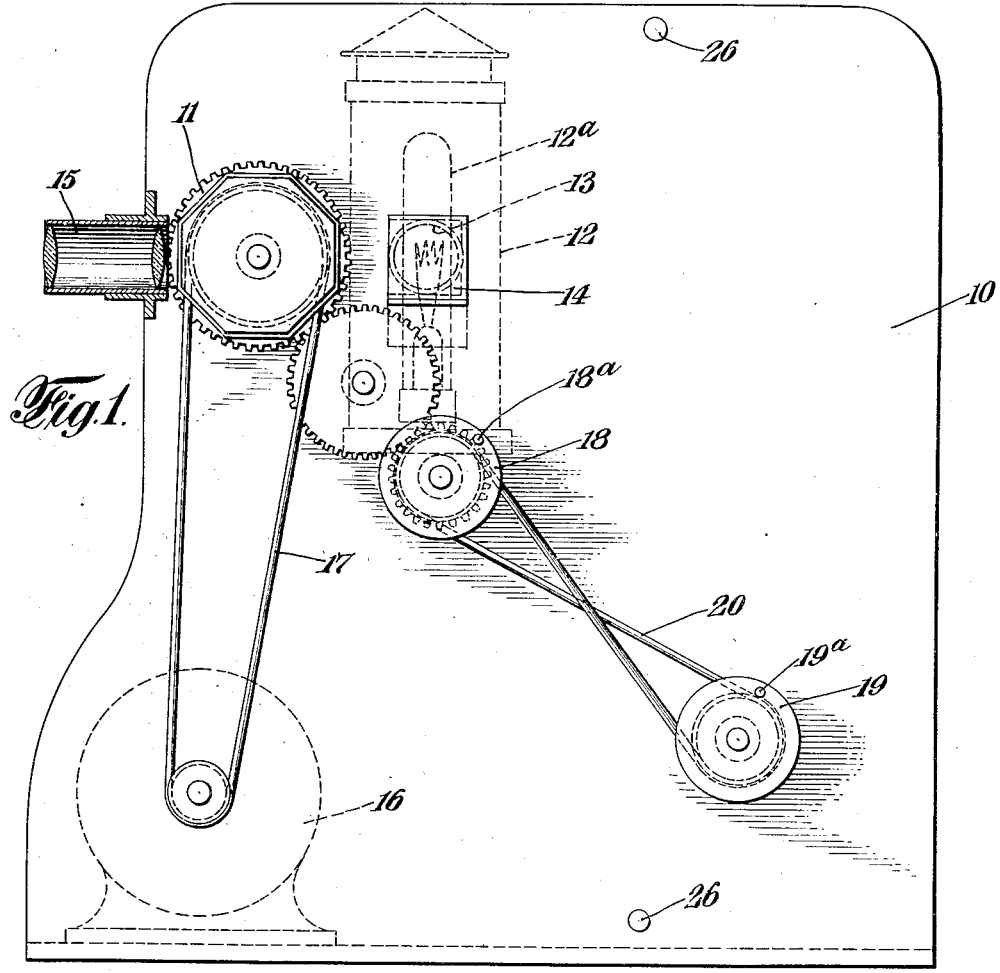
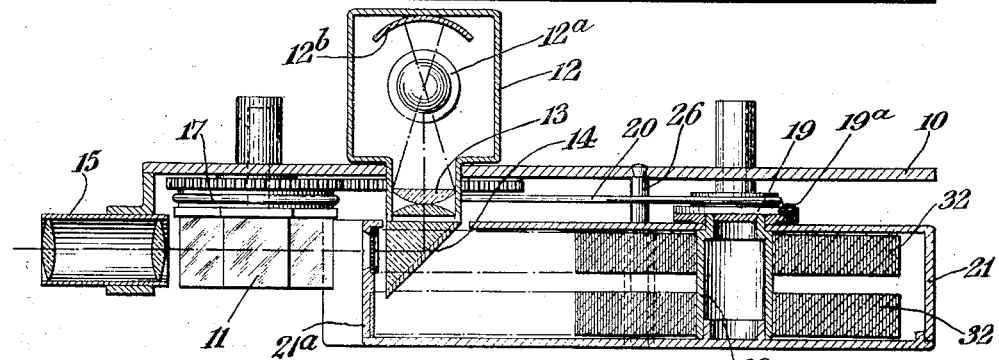
INVENTOR.
Jacob F. Leventhal
BY Kenyon & Kenyon
ATTORNEYS.

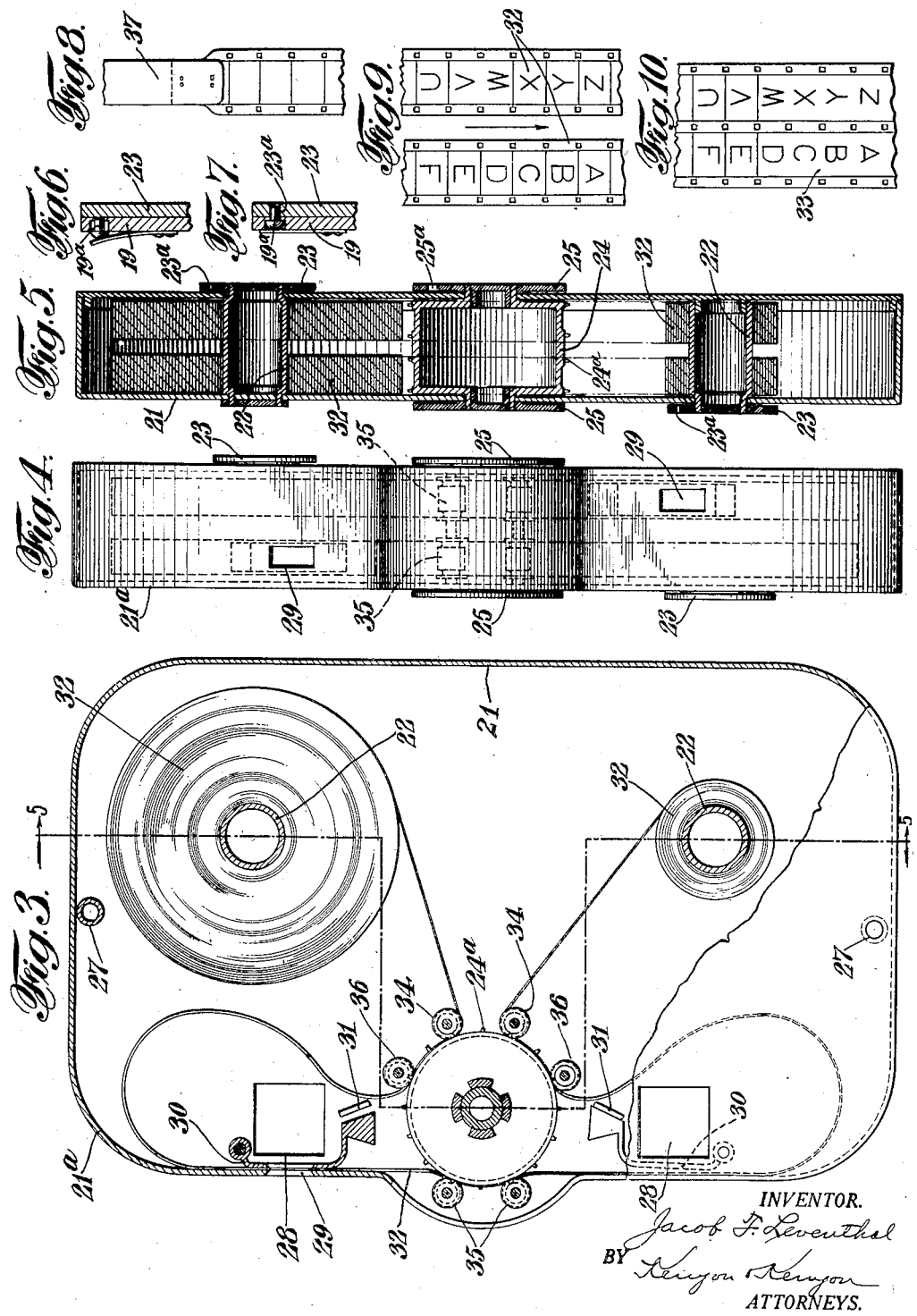

Patented Nov. 14, 1933

1,935,572

UNITED STATES PATENT OFFICE 1,935,572

FILM FEEDING DEVICE

Jacob F. Leventhal, New York, N. Y., assignor to The First National Bank of Chattanooga, trustee, Chattanooga, Tenn.

Application September 14, 1928
Serial No. 305,901

10 Claims. (Cl. 88—16)

This invention relates to motion picture projectors and more especially to improvements in film feeding devices for such machines.

In the projection of rented motion picture films by amateur operators as in homes, schools, clubs, churches and the like, considerable difficulty is experienced in manipulating the film prior and subsequent to the exhibition of the film. This difficulty is found mainly in the threading of the film into the projector before exhibition and the rewinding of the film after exhibition. In addition the handling of the film by an amateur operator often results in mutilation thereof and the life of the film is materially reduced.

An object of this invention is to eliminate such handling of the film by enclosing it within a container and providing means for feeding the film into operative relationship to the light source and lens of a projector while maintaining the film completely within the casing.

One embodiment of the invention comprises a casing within which are rotatably mounted two spaced shafts, each of which serves either as a supply spool or a take-up spool for motion-picture film enclosed within the container and having its ends fastened to the shafts. Intermediate the shafts there is provided feeding means for drawing the film from the shaft acting as the supply spool and delivering it to the shaft acting as the take-up spool.

Means are provided for positively driving the feeding means and for frictionally driving whichever shaft is acting as the take-up spool. The film may constitute either two strips, each provided with a standard row of pictures, or may be a single strip provided with two standard rows of pictures. In either event, the rows of pictures are oppositely or reversely arranged, the start of each being adjacent the end of the other, so that as the film is drawn off one spool and delivered to the other spool one row of pictures moves forwardly and the other row of pictures moves backwardly. The casing is provided with projection apertures individual to each row of pictures and means are provided to associate the casing with a projector in either of two positions whereby the forwardly moving row of pictures traverses the optical axis of the projector so that this row of pictures is projected. The casing is of such design that after the film has been unwound from one spool and wound on the other, its position with respect to the projector may be reversed. The second row of pictures is now the forwardly moving row and is caused to traverse the optical axis and be projected by feeding the film from the second to the first spool.

With the device above described the film is at all times completely enclosed by the container and is subject to no handling. No threading of the film is required in order to bring it into projecting relationship to the light source and the projecting lens. The film is automatically properly positioned when the casing is associated with the projector. There is substantially no opportunity for any mutilation of the film and the life thereof is correspondingly increased. By virtue of the duplex arrangement of rows of pictures, one row is always ready for projection immediately after the projection of the other row has been finished. No separate rewinding operation is required. The change from one row of pictures to the other merely involves reversal of the position of the casing on the projector.

Other objects, novel features and advantages of this invention will be apparent from the following specification and accompanying drawings wherein:

Fig. 1 discloses a motion picture projector with which the film feeding device is used.

Fig. 2 is a horizontal section through such projector with the film feeding device mounted thereon.

Fig. 3 is a side elevation partially broken away of a film feeding device embodying the invention.

Fig. 4 is an end elevation thereof.

Fig. 5 is a section on the line 5—5 of Fig. 3.

Figs. 6 and 7 are sectional views of the latch mechanism between the driving mechanism and film spool, and Figs. 8 to 10 inclusive are detail views of the film.

The embodiment of the invention specifically disclosed and particularly described herein is adapted for use in connection with projectors in which the film is fed at a uniform rate of speed. The invention, however, is not limited to such embodiment but may also be employed in connection with projectors in which the film is fed intermittently.

Referring now to Fig. 1, 10 designates the main frame of a projector upon which is rotatably mounted an optical rectifier 11, capable of cooperating with uniformly moving film to present an apparently stationary picture. A lamp housing 12 is supported by the frame 10 and is provided with the usual condensing lens 13. A reflecting prism 14 is supported by the frame 10 in alignment with the condensing lens 13 and directs light from the lamp 12a and its mirror 12b through the rectifier 11. An objective lens 15 supported by the frame 10 in optical alignment with the prism 14 and rectifier 11, completes the optical system of the projector.

The rectifier 11 is driven by a motor 16 through the medium of a belt 17. A plate 18 is rotatably mounted on the frame 10 and a similar plate 19 is also rotatably mounted on the frame 10 and is spaced from the plate 18. The plate 18 is driven from the rectifier 11 by means of a train of gears and the plate 19 is driven from the plate 18 by means of a spring belt 20, the direction of rotation of the plate 19 being opposite to that of the plate 18.

The film feeding mechanism comprises a box-like casing 21, the front and rear faces of which are substantially rectangular. Two similar spools or shafts 22 are rotatably mounted in the casing and have heads 23 arranged exteriorly of the casing, the heads being arranged on opposite sides of the casing. A sprocket wheel 24 is also rotatably mounted in the casing 21 and is provided with heads 25 arranged exteriorly of the casing on both sides. The distance between the axis of sprocket 24 and the axis of each spool 22 is the same as the distance between the axes of the plates 18 and 19. The heads 23 and 25 are provided with sockets 23a and 25a to receive the pins 18a and 19a of the plates 18 and 19. The frame 10 is provided with dowel pins 26 and the casing 21 is provided with tubular members 27 to receive such dowel pins. The casing 21 may thus be supported from the frame 10 in either of two positions with one head 25 of the sprocket 24 locked to the plate 18 and the corresponding head 23 of one spool 22 locked to the plate 19. The pins 18a and 19a are yieldingly mounted in their respective plates as shown in Figs. 6 and 7, so that it is not necessary to line up the pins with their apertures when mounting the casing on the frame. The pins will snap into the apertures when alignment is effected by rotation of the plates 18 and 19.

The casing 21 is provided in its front and back faces with apertures 28, each of which permits the insertion within the casing of the prism 14. The particular aperture 28 through which the prism projects depends entirely upon which face of the casing 21 is adjacent the plate of the frame 10, it being possible to have either face in this position merely by reversing the casing on its supports. In the wall 21a of the casing and in substantial alignment with the apertures 28 are provided two projection apertures 29 which are laterally off-set from each other. A weighted apertured guide plate or gate 30 is pivotally mounted adjacent each aperture 29 and is provided with a stop 31. The arrangement of these plates is such that when the casing is mounted on the projector frame 10, the upper plate is pulled toward the casing by gravity and the lower one is pulled away from the casing by gravity.

A duplex motion picture film is provided within the casing. This film may comprise a pair of ribbons 32 each having a standard row of pictures or as shown in Fig. 10, it may comprise a single ribbon 33 having two standard rows of pictures. The duplex film is fastened at its ends to the spools 22 and may be wound up on either spool as desired. The film is drawn off one spool and supplied to the other by means of the sprocket 24, the teeth 24a of which engage the usual perforations in the film. Each film is held in contact with the sprocket wheel 24 at three different places by the rollers 34, 35 and 36. Between the rollers 35 and each other set of rollers, each film is formed in a loop and passes between a plate 30 and the wall 21a of the casing and across one projection aperture 29.

The arrangement of the pictures in each row is standard, that is, the top and bottom of each picture are adjacent respectively the bottom of the preceding picture and the top of the succeeding picture. The rows are reversely arranged however, with the start of each row adjacent the end of the other (see Figs. 9 and 10) so that when the films are fed from one spool to the other, one row of pictures moves forwardly while the other row of images moves rearwardly. Thus, when the films are wound up on either of the spools one of them is always ready for projection and the other is ready for re-winding. While one is being projected the other one is being rewound and made ready for projection. The sprocket 24 serves to draw the film off one spool and feed it to the other as well as draw it across the projection apertures.

To prevent over feeding of the films a metal ribbon 37 of less width than the film is provided at the end thereof. This ribbon is sufficiently narrow to pass between the teeth 24a of the sprocket wheel 24, so that no pull will be exerted on it by the sprocket wheel.

In the use of this film feeding device, the casing with the film wound up upon one of the spools 22, threaded around the sprocket wheel and rollers as shown in Fig. 3 and attached to the remaining spool is mounted on the projector frame by means of the dowel pins 26 and tubular members 27 with the plate 23 of the empty spool 22 in contact with the plate 19 and the corresponding head 25 of the sprocket 24 in contact with the plate 18. The prism 14 extends through the aperture 28 in the rear face of the casing and directs light through the forwardly moving row of pictures and the corresponding aperture 29 to the rectifier 11.

The optical rectifier 11 is driven by the motor 16 and in turn drives the plate 18, thus causing the rotation of the sprocket wheel 24 and linear movement of the film in synchronism with the rotational movement of the rectifier. The upper plate 30 is pulled by gravity toward the wall of the casing and cooperates therewith to guide and hold the film smooth as it is drawn over the aperture 29. The lower plate 30 is pulled away from the casing wall by gravity so that the film passes freely between it and the casing wall. The plate 19 is frictionally driven from the plate 18 by the spring belt 20 and drives the empty spool 22 at the proper speed to take up the film as fast as it is delivered from the sprocket wheel around the rollers 34. The sprocket wheel not only draws the film across the projection aperture but also draws off the film from the supply spool and delivers it to the take-up spool.

Should the operator fail to stop the operation of the projector when the end of the picture is reached the feeding of the film will be stopped automatically by reason of metal strips 37, thus preventing the possibility of unfastening the film from the spool. The sprocket wheel teeth will straddle the strip 37 and the wheel will exert no pull on the strip.

After the film has been transferred from the full spool to the empty spool and one set of pictures has been projected, the casing is removed from the frame, reversed and replaced on the frame with the empty spool locked to the plate 19 and the film run in the opposite direction to project the other row of images. Because of the loops in the film between the rollers 34, 35 and 36 and the three point engagement of the film with the sprocket, the film is fed uniformly and steadily and is not subjected to any jerks or the like.

I claim:—

1. In a motion picture projector, a positively driven rotatable member, a casing having a sprocket and two spools rotatably mounted therein, means for engaging said sprocket with said positively driven member, means for frictionally driving either of said spools, duplex motion picture film engaged with said sprocket and fastened at its ends to said spools, said film being provided with reversed standard rows of pictures whereby one row moves forwardly and the other row moves rearwardly as the film is fed by said sprocket from one spool to the other and means for supporting the casing with one row of pictures traversing the optical axis of the projector.

2. In a motion picture projector comprising a positively driven rotatable member, a casing having a sprocket and two spools rotatably mounted therein, means for engaging said sprocket with said positively driven member, means for frictionally driving either of said spools, duplex motion picture film engaged with said sprocket and fastened at its ends to said spools, said film being provided with two standard rows of pictures, the start of each row being adjacent the end of the other, whereby one row moves forwardly and the other row moves rearwardly as the film is fed by said sprocket from one spool to the other, a projection aperture individual to each row of images and means for supporting the casing with one row of pictures traversing the optical axis of the projector.

3. Film feeding means comprising a casing being adapted to be arranged in either of two positions, a sprocket and two spools rotatably mounted therein, duplex motion picture film engaged with said sprocket and having its ends fastened to said spools, said film being provided with two standard rows of pictures, the start of each row being adjacent the end of the other, whereby one row moves forwardly and the other row moves rearwardly as the film is fed by the sprocket from one spool to the other, a projection aperture individual to each row of pictures and gravity actuated means adjacent each projection aperture for applying pressure to the film, each of said means being operative in one position of the casing and inoperative in the reverse position.

4. Film feeding means comprising a casing being adapted to be arranged in either of two positions, two spools rotatably mounted therein duplex motion picture film mounted on such spools, means for feeding said film from either spool to the other, said film being provided with two standard rows of pictures, the start of each row being adjacent the end of the other, whereby one row moves forwardly and the other row moves rearwardly as the film is fed in either direction, a projection aperture individual to each row of images and a gravity actuated gate adjacent each projection aperture, each gate being operative in one position of the casing and inoperative in the reverse position.

5. In a motion picture projector, a rotatable member, a casing having a sprocket and two spools rotatably mounted therein, means for supporting the casing in either of two positions with the sprocket in driving engagement with the rotating member, means for frictionally driving either of said spools, duplex motion picture film engaged with said sprocket and fastened to said spools, said film being provided with two standard rows of pictures, the start of each row being adjacent the end of the other, whereby one row moves forwardly and the other row moves rearwardly as the film is fed by said sprocket from either spool to the other and means for projecting light through the forwardly moving row of pictures.

6. In a motion picture projector, a rotatable member, a casing having a sprocket and two spools rotatably mounted therein, means for supporting the casing in either of two positions with the sprocket in driving engagement with the rotating members, means for frictionally driving one of said spools, duplex motion picture film engaged with said sprocket and fastened to said spools, said film being provided with two standard rows of pictures, the start of each row being adjacent the end of the other, whereby one row moves forwardly and the other row moves rearwardly as the film is fed by said sprocket from one spool to the other, a projection aperture individual to each row of pictures and an optical system including a prism, said casing being provided with an aperture individual to each row of pictures for receiving said prism.

7. In a motion picture projector, an optical system including a reflector, a casing, duplex motion picture film mounted therein for reeling and unreeling, means for feeding said film in either of two directions, said film being provided with two standard rows of pictures, the start of each row being adjacent the end of the other row whereby one row moves forwardly and the other row moves rearwardly as the film is fed in either direction and means for supporting said casing in either of two positions with the forwardly moving row of pictures traversing the optical axis of the projector, said casing being provided with a projection aperture individual to each row of pictures and an aperture individual to each row for receiving said reflector.

8. Film feeding means comprising a casing, a sprocket and two spools rotatably mounted therein, a pair of spaced projection apertures, duplex motion picture film engaged with said sprocket and having its ends fastened to said spools, said film being provided with two standard rows of pictures, the start of each row being adjacent the end of the other row whereby one row moves forwardly and the other row moves rearwardly as the film is fed by the sprocket from one spool to the other, means for guiding the film into operative engagement with the sprocket at three points thereby forming two loops of film and means for guiding the looped portions of the film to direct one row of pictures across one projection aperture and the other row of pictures across the other projection aperture.

9. Film feeding means comprising a casing, a sprocket and two spools rotatably mounted therein, a pair of spaced projection apertures, duplex motion picture film engaged with said sprocket and having its ends fastened to said spools, said film being provided with two standard rows of pictures, the start of each row being adjacent the end of the other row whereby one row moves forwardly and the other row moves rearwardly as the film is fed by the sprocket from one spool to the other, means for guiding the film into operative engagement with the sprocket at three points thereby forming two loops of film and gravity operated gates for guiding the looped portions of the film to direct one row of pictures across one projection aperture and the other row of pictures across the other projection aperture.

10. In a motion picture projector, a casing, a sprocket and two spools rotatably mounted therein, a pair of spaced projection apertures, duplex film engaged with said sprocket and having its ends fastened to said spools, means for guiding the film into operative engagement with the sprocket at three points thereby forming two loops, said film being provided with two standard rows of pictures, the start of each row being adjacent the end of the other row whereby one row moves forwardly and the other row moves rearwardly as the film is fed by the sprocket from one spool to the other, means for guiding the looped portions of film to direct one row of pictures across one projection aperture and the other row across the other projection aperture, means for supporting said casing in either of two positions with the forwardly moving row of pictures traversing the optical axis of the projector, said casing being provided with apertures to permit the passage of light through the rows of pictures and driving means engageable with said sprocket in either of said positions.

JACOB F. LEVENTHAL.